Nov. 2, 1943.        J. F. RUDE        2,333,586
SPRING TOOTH HARROW
Filed Jan. 22, 1942        2 Sheets-Sheet 2

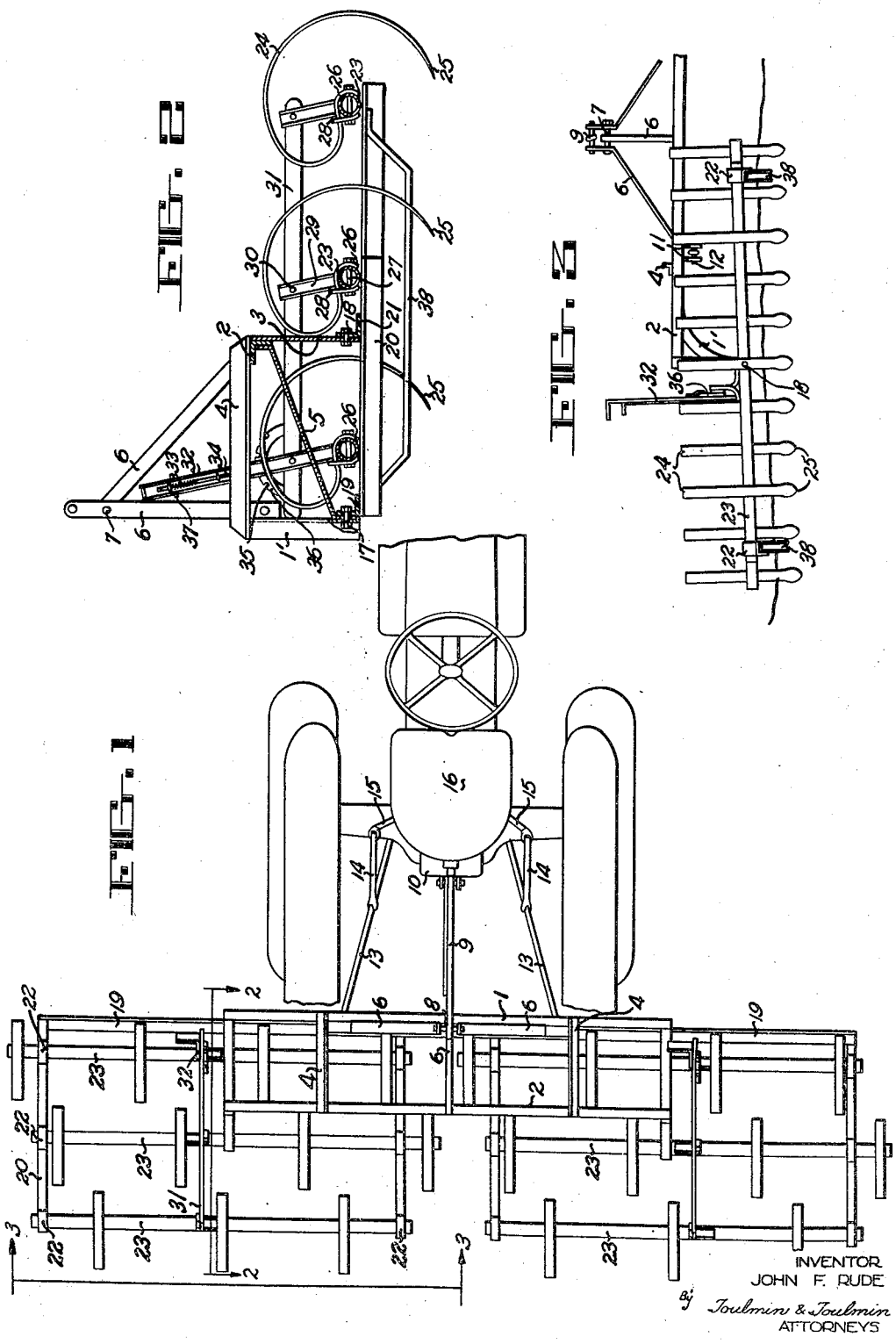

INVENTOR
JOHN F. RUDE
By Toulmin & Toulmin
ATTORNEYS

Patented Nov. 2, 1943

2,333,586

UNITED STATES PATENT OFFICE 2,333,586

SPRING TOOTH HARROW

John F. Rude, Evansville, Ind., assignor to Blount Plow Works, Evansville, Ind., a corporation of Indiana Application January 22, 1942, Serial No. 427,785

10 Claims. (Cl. 55—92)

The present invention relates to farm implements, and more particularly to tractor-drawn spring tooth harrows.

There are, in general, three types of harrows which are employed on farms, i. e. spike tooth, spring tooth and the rotating disc type. However, the main purpose of all of these harrows is to level off the ground and break up clods of soil which may be caused, for example, by roots, so that the function of the harrow is in general to prepare the ground for seeding.

The present invention is directed entirely to the spring tooth form of harrow. The difference between this type of harrow and the spike tooth is that the spring tooth harrow is employed where the clods of soil tend to be rather large and there may be other obstructions in the ground to be worked, because in this case the springiness or yielding character of the teeth will permit the teeth to pass over or around an immovable object or obstruction. On the other hand, the spike tooth harrow is employed where the ground is less rough or coarse because the teeth are of a rigid non-yieldable character. Inasmuch as the spring tooth harrow is employed in connection with rough or stony ground, considerable difficulty has been encountered prior to this invention in relieving some of the strains which obviously are imparted to the teeth, and particularly to eliminate such strain brought about by irregularities in the contour of the terrain, which consideration is quite different from the absolute character of the ground itself. For example, when a harrow of the spring tooth prior-art type is being drawn along a ridge which slopes downwardly on either side of the harrow, and assuming that the harrow frame constitutes an unyielding structure, it is apparent that both slopes of the ground cannot be harrowed effectively at the same time because one portion of the harrow will conform itself to the immediate slope of the ground, which would leave the remainder of the harrow above the ground and in a position in which the spring teeth perhaps have not even entered the ground.

The primary object of the present invention is to provide an improved spring tooth harrow in which the elements are mounted on a flexible frame and so arranged that all parts of the harrow will contact, to an equal extent, the entire area of the ground being worked and regardless of the irregularities of the ground, differences in the direction and angle of slope, etc. Thus the improved spring tooth harrow is adapted to do work over bumpy or hilly ground and when suitably designed, in accordance with the principles hereinafter set forth, may even be employed to cultivate acreage on the sides of mountains, valleys, etc.

Again, difficulty has been encountered with prior types of spring tooth harrows in removing the spring teeth from the ground as a unit when the harrow, for example, is being drawn across the ends of the field preparatory to harrowing the next row, and also when the harrow is being drawn over the highways. It will be understood that when the spring teeth have reached the end of a worked row they may be embedded quite deeply in the ground, and due to the curved configuration a quantity of soil of considerable weight may bear down on each tooth, making it difficult to raise the teeth instantaneously with sufficient force to overcome the resiliency of the teeth. The difficulty of elevating the teeth is enhanced in case the soil is of a rooty character and the teeth tend to become wedged under the roots.

In accordance with another feature of my invention there is provided mechanism by which all of the spring teeth of the harrow may be powerfully removed from the ground simultaneously, even in the case of rough or rooty soil, and without the slightest tendency to break any of the spring teeth. The mechanism is so arranged that regardless of the number of harrow sections all of them are operated simultaneously by the manipulation of a lever which is accessible from the operator's position.

Still another object is to provide a harrow of the spring tooth type in which the vertical position of the teeth of the harrow, with respect to the ground, may be accurately controlled in order to regulate the depth to which the teeth enter the ground. This tooth-elevating mechanism operates in such a manner that the movement of the spiral form of teeth takes place along the configuration of the teeth in order to minimize strain and to render the operation of the elevating mechanism as easy as possible.

The invention will be better understood when the following specification is read in connection with the accompanying drawings.

In the drawings:

Figure 1 represents a plan view of the improved spring tooth harrow, and showing the relative position of the tractor.

Figure 2 is a transverse sectional view of the harrow taken along the line 2—2 in Figure 1, and looking in the direction of the arrows.

Figure 3 is an end elevational view of one of the harrow sections and taken at about the line 3—3 indicated in Figure 1 to show the single harrow section in its tilted position.

Figure 4:
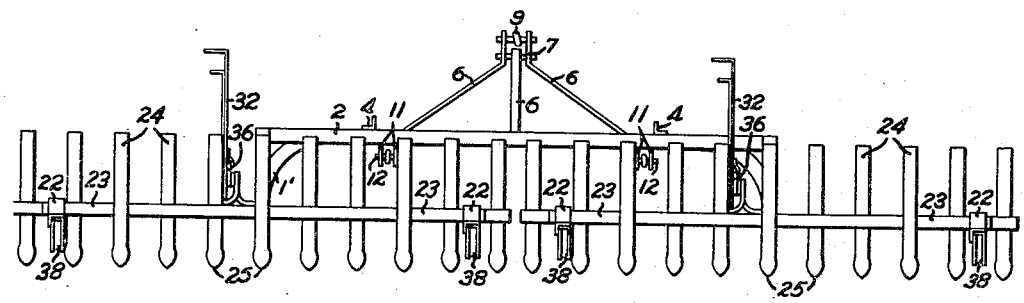
Figure 4 is a rear elevational view of the entire harrow.

The harrow is carried on a rigid lift frame, the elements of which together with the harrow, constitute a box-like arrangement, and the frame as a whole is adapted to be connected to a suitable source of motive power, for example, a tractor. The arrangement is such that the frame is adapted to be lifted through suitable linkage bars which connect the frame to the differential rear housing, or other convenient portion of the tractor. This frame, in general, is constituted of a structural member 1 having a U-shaped cross section which spans the two sections of the harrow. The member 1 has a relatively long rectilinear portion terminating at each end in a curved portion 1', where the end is swivelly connected to each harrow section as will be explained hereinafter. Thus the structural member takes the shape of a large inverted U, and in general extends between positions about midway of each of the harrow sections.

Another part of the box frame, to the rear of the U-shaped frame, is constituted of a rectangularly shaped angle iron member 2 which is of approximately the same length as the front U-shaped member. This angle iron member may comprise a long rectilinear and horizontally disposed piece with a pair of downwardly extending vertical angle iron portions 3 positioned at each end. The structural members 1, 2 are spanned at two places along the top surface by a pair of angle iron lengths 4, and at the extreme ends of the structural members 1, 2 there is provided a pair of diagonal reenforcing bars 5 (Figure 2) which are secured in any suitable manner to the inside surfaces of the structural members 1, 2.

The rigid box frame as thus described is adapted to be moved in the vertical direction from a position at the driver's seat through mechanism which will now be described. A frame, exemplified as a tripod, is provided at the top of the box frame, this frame being formed of three or more angularly extending arms 6, of which two have been shown in Figure 2. Two of the arms of the tripod, or other type of frame, extend in the vertical direction, looking toward the end of the harrow, but are angularly disposed with respect to one another, looking toward the front of the harrow. These two front arms are secured in any suitable manner to the front structural member 1 at about the position of the transverse angle irons 4. The third arm of the frame is secured to the rear structural member 2 and extends at an angle toward the front, looking in the direction of the end of the harrow. But this third arm preferably extends along the middle of the harrow, when viewed from the front of the machine, and may be connected at its upper end through a bolt 7 to the front arms 6, and at the lower end is secured in any suitable manner to the rear structural member 2.

Figure 5:
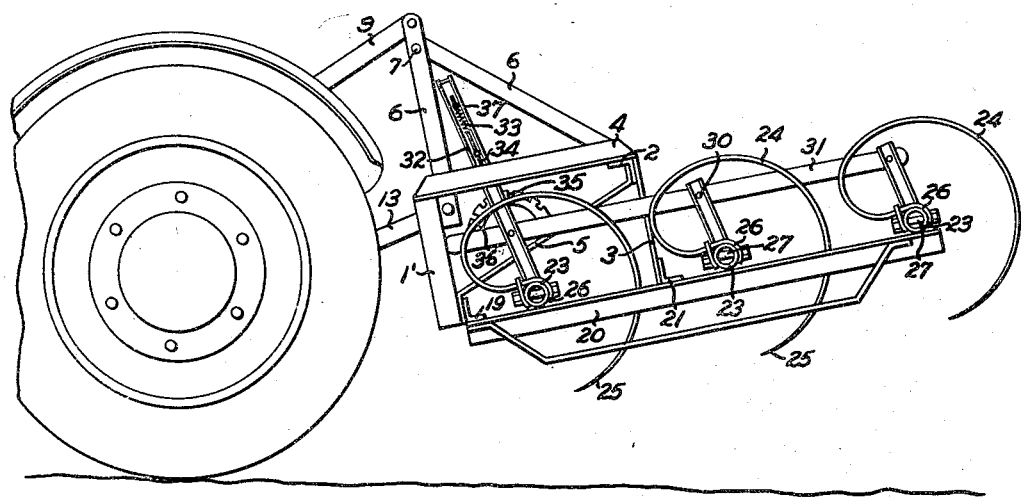
Figure 5 is a side elevational view showing the entire harrow in a lifted position.

The uppermost ends of the front tripod arms 6 are provided with a draw bar 8, to which is swivelly connected a heavy compression bar 9, the latter being secured through a compression spring to the housing 10 of the tractor's differential gear mechanism. A pair of plates 11 is dropped from the structural member 2 at each side of the harrow and directly below the position where the angularly extending tripod arms 6 are secured to the member 2. The plates 11 are spaced apart to receive a swivel bolt 12, on which is mounted a bar 13, this bar being connected at the front end to opposite sides of the differential housing 10. The arrangement is such that if the bars 13 were to be lifted, in any suitable manner, one of which will be described presently, the framework including the structural members 1, 2, and in fact the entire harrow, will be moved upwardly through a corresponding angle. The bars 13 may be given an elevating motion from the driver's seat through a linkage comprising angularly disposed swivel rods 14 which are connected at the top with the yoke member 15, the latter being adapted to move in the vertical direction when actuated by a lever (not shown) positioned near the operator's seat 16. Thus by merely reaching back and pulling on the lever the operator may cause the bars 13 to be raised simultaneously, which has the effect of elevating all sections of the harrow through an angle determined by the angular distance through which the lever is moved. The effect of lifting the entire harrow from the operator's position is shown in Figure 5.

The invention has been typified in connection with a two-section harrow and each section is pivotally joined to the main framework of the machine in such a manner that the section may rock in the vertical direction to accommodate irregularities of the ground contour, irrespective of the other section. For this purpose each harrow section is carried on a pair of swivel joints 17, 18 (Figure 2), the swivels of each pair being in line with one another and extending down the length of each harrow section. The front swivel 17 of each swivel pair is mounted on the downwardly extending end portions 1' of the front structural member 1 and swivelly carries an angle iron 19, the length of which is approximately the width of each harrow section. The opposite ends of each angle iron member 19 are secured to a short transversely extending angle iron 20, these angle iron elements 20 representing substantially the width of each harrow section. The harrow elements of each section are either all contained between or mounted on the angle irons 20, as will be explained presently. Each swivel joint 18 is carried by the portion 3 of the rear structural member 2, and the swivel connects with the angle iron 21 which extends transversely of each harrow section, and from the angle iron portion 3 inwardly as far as the angle iron lengths 20. The latter are secured to the angle iron elements 21.

There are three bearings, indicated at 22, formed of circular strap members secured to the upper surfaces of the angle iron members 20, these bearings carrying three spaced pipes 23 per harrow section, and each pipe extends along the width of the harrow in parallel alignment. These pipes, together with the end angle iron elements 20, form a rigid rectangular frame which is pivotally mounted at the swivel joints 17, 18 on the structural frame members 1, 2 so that each frame is adapted to rock about these swivel joints in the vertical direction and independently of one another. The harrow elements are of the spring tooth type, and as illustrated take the form of strap members 24 having a spiral shape and terminating at the bottom end in a fairly sharp point 25. The upper or inner ends of the harrow teeth are provided with a hook-shaped portion 26 which conforms to the circular shape of the pipe 23 and is held in position by a bolt 27 passing diametrically through each pipe, and is clasped at the other end by a bifurcated yoke member 28. Thus by tightening the bolt 27 each spring tooth element 24 is rigidly clamped about the transversely extending pipes 23. As illustrated, there are four spring tooth elements 24 mounted on the front pipe member 23 of each harrow section, four elements on the second pipe and three elements on the rear pipe member, these harrow elements being preferably arranged in a staggered relation, as will be well understood in the art.

The effect of permitting each harrow section to be tilted about the pivots 17, 18 may be readily understood by consideration of Figure 3, which shows a harrow section in its tilted position. Assume that the depth to which the points 25 of the harrow teeth dig into the ground has been controlled by the tripod-elevating lever (not shown) at the driver's seat. Now suppose that as the harrow is being drawn over the ground the contour of the field should suddenly change, as for example if a bump or depression should suddenly appear. The harrow section directly over the bump or depression will automatically accommodate itself to the contour of the ground at this point by swinging about the swivels 17, 18 and without any attention whatsoever from the operator. In Figure 3 the tilt of the harrow section is such that the outer end of the section is moved downwardly and the inner end is moved upwardly. Thus the depth to which the points 25 have penetrated the soil remains substantially uniform notwithstanding a change in contour of the ground. It will be understood that the tripod-elevating lever at the driver's seat is operated only for the purpose of moving the spring tooth elements 24 entirely free of the ground, as for example, when the harrow is being drawn across the field from one harrowed row to the next row to be harrowed.

In order to regulate the exact depth to which the harrow points 25 will dig into the ground, an additional mechanism, which will now be explained, may be employed. At a position in each harrow section approximately midway between the angle irons 20, the pipes 23 are provided with upwardly extending bars 29 of relatively short length, and these bars are swivelly secured as indicated at 30 to a longitudinally extending bar 31, which in effect swivelly connects all three pipes of any one section together. One of the upwardly extending bars 29, preferably the front bar, may be provided with an extension indicated at 32, having a hollow interior and containing a spring mechanism 33 which forces a pawl 34 into a notch 35 of a segmental element 36. The arrangement is such that by means of a rod 37, which extends to the interior of the extension 32, the pawl 34 may be withdrawn from the notch 35. The segmental element 36 is secured to the bar 31 so that when the pawl is withdrawn and the lever 32 is swung to the right or left, the bar 31 is given a corresponding movement in the horizontal direction to cause the pipes 23 to rotate in their bearings 22.

The harrow elements 24 are so shaped that when the pipes 23 are rotated the ends 25 will move either upwardly or downwardly in a path which has the same shape as the harrow elements 24. In other words, the points 25 will move through a circular path which is concentric with the center of the pipes 23. Such a movement is advantageous in that it provides an easy withdrawal or insertion of the points 25 from or into the soil. There is no tendency for these points to move directly vertically upward and therefore no possibility of snapping off the points of the harrow elements in case any one point had dug, for example, under a heavy root or had become wedged under closely knit or unbreakable sod. As another provision for preventing fracture of the spring tooth elements 24, and more particularly to relieve these elements of carrying any appreciable part of the weight of the frame, there may be provided at the ends of each harrow section a pair of U-shaped structural skids 38. These skids tend to ride on the surface of the ground, although when the ground is soft they may penetrate the surface to a small depth, and the general purpose is to carry part of the weight of the harrow framework, thus relieving the points 25 and the tripod-lifting structures 13, 9 of this load.

It will be understood that I desire to comprehend within my invention such modifications as come within the scope of the claims and the invention.

Having thus fully described my invention, what I claim as new and desire to secure by Letters Patent, is:

1. A spring tooth harrow comprising a main frame adapted to be drawn by a source of motive power, a plurality of auxiliary frames swivelly mounted at least at two positions on said main frame, and spring tooth harrow elements secured to each of said auxiliary frames, the position of the swivels being such as to permit the auxiliary frames to rotate about axes which are parallel to the longitudinal axis of the harrow.

2. A spring tooth harrow comprising a main frame adapted to be drawn by a source of motive power, a plurality of auxiliary frames, each swivelly mounted at least at two positions on said main frame, a plurality of rods rotatably mounted on said auxiliary frames, spring tooth harrow elements secured to said rods, and common means for rotating said individual rods with respect to said auxiliary frames in order to control the average height of the harrow elements from the ground, the swivels between said auxiliary frames and the main frame serving to permit each auxiliary frame to move with respect to the main frame and about axes parallel to the longitudinal axis of the harrow.

3. In an earth-working farm implement, the combination of a traction device and earth-leveling apparatus pivotally secured to said device, said apparatus including a main frame and a plurality of auxiliary frames each of which is pivotally mounted on a pair of pivots longitudinally disposed on said main frame, said auxiliary frames carrying spring tooth harrow elements which are adapted to extend into the ground when the apparatus is in its operative position, and means accessible from the operator's position on the traction device for controlling the average height of the spring tooth harrow elements with respect to the ground.

4. An improved spring tooth harrow comprising a box frame which is adapted to be pivotally carried on a traction device, said harrow being formed of a plurality of sections each of which is pivotally mounted on a pair of pivots longitudinally disposed on said frame to permit a swinging motion of each of said sections in the vertical plane, said frame being secured to said harrow sections in such a manner that the sections are liftable as a whole with respect to said traction device but are independently swingable on said box frame along axes which are parallel to the longitudinal axis of the harrow, and spring tooth harrow elements secured to each of said sections.

5. An improved spring tooth harrow comprising a box frame which is adapted to be pivotally carried on a traction device, said harrow being formed of a plurality of sections which are pivotally mounted on a pair of pivots longitudinally disposed on said frame to permit a swinging motion of each of said sections along axes which are parallel to the longitudinal axis of the harrow, said frame being secured to said harrow sections in such a manner that the sections are liftable as a whole with respect to said traction device but permitting independent swingable movements along said axes on said box frame, rods rotatably mounted on each of said sections, spring tooth harrow elements rigidly secured to said rods, and means for rotating the rods of each section simultaneously in order to turn the spring tooth harrow elements and to control their vertical position with respect to the ground.

6. A spring tooth harrow comprising a main frame adapted to be drawn by a source of motive power, a plurality of auxiliary frames each of which is swivelly mounted on a pair of pivots longitudinally disposed on said main frame, rods rotatably mounted on each of said auxiliary frames, spring tooth harrow elements secured to said rods, said elements taking the form of a spiral and having curved earth-engaging portions, the center of curvature conforming to the center of the rod on which the harrow element is mounted, and means for simultaneously rotating the rods of each section in order to control the position of said harrow portions with respect to the ground.

7. A spring tooth harrow comprising a main box frame having a plurality of pairs of downwardly extending structural members, the members of each pair being in longitudinal alignment with one another and carrying at their lower ends a swivel, a plurality of auxiliary frames, each being mounted on an individual pair of swivels secured to each structural member pair in order to permit the auxiliary frames to move in the vertical direction with respect to the main frame, and spring tooth harrow elements secured to each of said auxiliary frames.

8. A spring tooth harrow comprising a main box frame having a plurality of pairs of downwardly extending structural members, the members of each pair being in longitudinal alignment with one another and carrying at their lower ends a swivel, a plurality of auxiliary frames mounted on the swivels of each structural member pair in order to permit the auxiliary frames to move in the vertical direction with respect to the main frame, rods rotatably mounted on each of said auxiliary frames, spring tooth harrow elements secured to said rods, and means for rotating the rods on each auxiliary frame simultaneously in order to control the height of the spring tooth elements with respect to the ground.

9. A spring tooth harrow comprising a main frame adapted to be drawn by a source of motive power, said harrow being formed of a plurality of sections, each of which is pivotally mounted on a pair of longitudinally disposed swivels which are secured to said frame to permit a swinging motion of each of said sections in the vertical plane, said frame being secured to said harrow sections in such a manner that the sections are liftable as a whole with respect to said source of motive power but are independently swingable on said main frame.

10. A spring tooth harrow comprising a main frame adapted to be drawn by a source of motive power, a plurality of auxiliary frames, each of which is swivelly mounted at least at two positions on said main frame in such a way as to permit the frame to rotate about an axis which is parallel to the longitudinal axis of the harrow, spring tooth harrow elements secured to each of said auxiliary frames, and means for lifting said main frame with respect to said source of motive power.

JOHN F. RUDE.